US012577992B2

(12) United States Patent (10) Patent No.: US 12,577,992 B2
Johansson et al. (45) Date of Patent: Mar. 17, 2026

(54) BRAKE DEVICE, DRIVE UNIT, AND INDUSTRIAL DEVICE

(71) Applicant: ABB Schweiz AG, Baden (CH)

(72) Inventors: Axel Johansson, Solna (SE); Jonas Larsson, Västerås (SE)

(73) Assignee: ABB Schweiz AG, Baden (CH)

( * ) Notice: Subject to any disclaimer, the term of this patent is extended or adjusted under 35 U.S.C. 154(b) by 382 days.

(21) Appl. No.: 18/250,769

(22) PCT Filed: Nov. 4, 2020

(86) PCT No.: PCT/EP2020/080911
§ 371 (c)(1),
(2) Date: Apr. 27, 2023

(87) PCT Pub. No.: WO2022/096084
PCT Pub. Date: May 12, 2022

(65) Prior Publication Data
US 2023/0392656 A1 Dec. 7, 2023

(51) Int. Cl.
*F16D 55/38* (2006.01)
*B60K 7/00* (2006.01)
(Continued)

(52) U.S. Cl.
CPC ............ *F16D 55/38* (2013.01); *B60K 7/0007* (2013.01); *B60T 1/005* (2013.01); *B60T 1/065* (2013.01);
(Continued)

(58) Field of Classification Search
CPC .................. F16D 55/38; F16D 63/006; F16D 2055/0008; F16D 2055/0058;
(Continued)

(56) References Cited

U.S. PATENT DOCUMENTS 4,700,932 A 10/1987 Katsuno
5,186,287 A * 2/1993 Lindner .............. F16D 65/0006
188/72.3

(Continued)

FOREIGN PATENT DOCUMENTS

CH 354635 A 5/1961
CN 101341009 A 1/2009
(Continued)

OTHER PUBLICATIONS

International Search Report and Written Opinion of the International Searching Authority; Application No. PCT/EP2020/080911; Completed: Jun. 15, 2021; Mailing Date: Jun. 23, 2021; 14 Pages.
(Continued)

*Primary Examiner* — Christopher P Schwartz
(74) *Attorney, Agent, or Firm* — Whitmyer IP Group LLC

(57) ABSTRACT

A brake device including a first device having a shaft; a brake element having a first frictional brake surface and an engageable structure; a second device rotatable relative to the first device about a rotation axis, the second device including a second member having an opening, a second frictional brake surface, and a forcing member pre-tensioned to force the second frictional brake surface against the first frictional brake surface; and an actuator connected to the first device, the actuator including an engaging structure movable between a disengaged position, and an engaged position to brake relative rotation between the first device and the second device about the rotation axis; wherein the shaft is concentric with the rotation axis and passes through the opening.

19 Claims, 10 Drawing Sheets

(51) Int. Cl.

| | | |
|---|---|---|
| *B60T 1/00* | (2006.01) | |
| *B60T 1/06* | (2006.01) | |
| *B60T 13/74* | (2006.01) | |
| *F16D 63/00* | (2006.01) | |
| *F16D 55/00* | (2006.01) | |
| *F16D 121/22* | (2012.01) | |

(52) U.S. Cl.
CPC .......... *B60T 13/746* (2013.01); *F16D 63/006* (2013.01); *B60K 2007/0092* (2013.01); *F16D 2055/0008* (2013.01); *F16D 2055/0058* (2013.01); *F16D 2121/22* (2013.01)

(58) Field of Classification Search
CPC .............. F16D 2121/22; B60K 7/0007; B60K 2007/0092; B60T 1/005; B60T 1/065; B60T 13/746
USPC .......... 188/68, 69, 171; 310/93, 96–98, 103, 310/105
See application file for complete search history.

(56) References Cited

U.S. PATENT DOCUMENTS

| | | | |
|---|---|---|---|
| 6,202,804 | B1 | 3/2001 | Dropmann et al. |
| 2006/0260886 | A1 | 11/2006 | Erlston et al. |
| 2008/0058163 | A1 | 3/2008 | Eiband |
| 2019/0030735 | A1 | 1/2019 | Chiu et al. |
| 2024/0003392 | A1* | 1/2024 | Johansson ............ B25J 19/0004 |

FOREIGN PATENT DOCUMENTS

| | | | |
|---|---|---|---|
| CN | 108603549 | A | 9/2018 |
| CN | 109291077 | A | 2/2019 |
| DE | 2730168 | A1 | 1/1979 |
| DE | 102018131876 | A1 | 6/2020 |
| EP | 3348362 | A1 | 7/2018 |
| EP | 3423732 | | 1/2019 |
| EP | 3423732 | A1 | 1/2019 |
| GB | 1295000 | A | 11/1972 |
| GB | 0002489 | | 3/2000 |
| IL | 186678 | | 2/2008 |
| JP | H07245909 | A | 9/1995 |
| JP | 2003011079 | A | 1/2003 |
| JP | 2005291398 | A | 10/2005 |
| WO | 2017148499 | A1 | 9/2017 |

OTHER PUBLICATIONS

International Preliminary Report on Patentability and Written Opinion of the International Searching Authority; Application No. PCT/EP2020/080911; Completed: May 8, 2023; 6 Pages.

Chinese Office Action; Application No. 2020801066993; Completed: Apr. 17, 2024; Issued: Apr. 18, 2024: 13 Pages.

* cited by examiner

10

12a

14

16

BRAKE DEVICE, DRIVE UNIT, AND INDUSTRIAL DEVICE

TECHNICAL FIELD

The present disclosure generally relates to a brake device. In particular, a brake device comprising an engaging structure for engaging an engageable structure of a brake element, a drive unit comprising a brake device, and an industrial device comprising a brake device or a drive unit, are provided.

BACKGROUND

Direct drive motors for industrial devices put new requirements on brake devices in comparison with conventional drive trains where a drive motor drives an actuator via an intermediate gearbox. For example, in an industrial robot comprising a direct drive motor, the brake device has to be capable of generating a relatively high braking torque, whereas in an industrial robot comprising a drive train having a gearbox, it may be sufficient if the brake device can generate a relatively low braking torque. This is because the brake device can be arranged on the high speed (low torque) side of the gearbox.

In order to make a traditional brake device work for direct drive motors (i.e., without any intermediate gearbox), the brake device may be scaled up significantly, meaning both larger size and higher energy consumption. In some brake devices, such as disc brakes and band brakes, the friction force is proportional to the clamping force. This implies that a releasing force is required to overcome the clamping force to release the brake device. This releasing force is normally generated by a solenoid or other electric actuator which has to provide a high force for a given braking torque. As a result, the braking device has a high energy consumption, generates a lot of heat and tends to be large.

In order to provide a more effective braking, a pin brake may be used. A pin brake may comprise an actuator having a pin selectively movable into and out from engagement with a brake disc forced against a brake surface. When the brake disc is engaged by the pin, rotation of the brake disc is prevented, and frictional braking is effected between the brake disc and the brake surface. In this way, the normal force creating the friction force to generate a braking torque is decoupled from the actuator.

WO 2017148499 A1 discloses a multiple disc brake for an industrial robot, wherein the multiple disc brake includes a hub. The multiple disc brake includes at least one friction disc arranged to the hub such that it rotates with the motion of the hub, and a braking disc arranged freely rotatable to the hub. The braking disc has at least one brake protrusion protruding in a radial direction of the braking disc, and an actuating arrangement including an actuator and a stop member. The actuating arrangement is arranged to move the stop member such that the stop member and the at least one brake protrusion become engaged, whereby any rotational motion of the braking disc is halted, and a braking force is created by friction acting between the at least one friction disc and the braking disc.

Although pin brakes can be made more compact than brake devices where the friction force is proportional to a clamping force, there remains a desire to provide an even more compact brake device. Furthermore, known pin brakes are typically mounted on an exposed rotatable shaft. In some implementations, such shaft is not available.

SUMMARY

One object of the present disclosure is to provide a compact brake device.

A further object of the present disclosure is to provide a brake device that is well suited for being used to brake a traction wheel of a drive unit having a shaft about which the traction wheel rotates and an electric wheel motor arranged to directly drive the traction wheel.

A still further object of the present disclosure is to provide a brake device having an energy efficient operation.

A still further object of the present disclosure is to provide a brake device having a simple design.

A still further object of the present disclosure is to provide a brake device having a cost-effective design.

A still further object of the present disclosure is to provide a brake device requiring few components.

A still further object of the present disclosure is to provide a brake device solving several or all of the foregoing objects in combination.

A still further object of the present disclosure is to provide a drive unit for an industrial device, which drive unit solves one, several or all of the foregoing objects.

A still further object of the present disclosure is to provide an industrial device comprising a brake device, which industrial device solves one, several or all of the foregoing objects.

According to one aspect, there is provided a brake device comprising a first device having a shaft; a brake element having a first frictional brake surface and an engageable structure; a second device rotatable relative to the first device about a rotation axis, the second device comprising a second member having an opening, a second frictional brake surface, and a forcing member pre-tensioned to force the second frictional brake surface against the first frictional brake surface; and an actuator connected to the first device, the actuator comprising an engaging structure movable between a disengaged position, where the engaging structure does not engage the engageable structure, and an engaged position, where the engaging structure engages the engageable structure to brake relative rotation between the first device and the second device about the rotation axis; wherein the shaft is concentric with the rotation axis and passes through the opening.

When the engaging structure adopts the disengaged position, the brake element rotates together with the second device. In order to brake the second device, the engaging structure is moved to the engaged position. The brake element thereby becomes locked such that sliding occurs between the first frictional brake surface and the second frictional brake surface. The friction between the first frictional brake surface and the second frictional brake surface brakes the rotational speed of the second device. When the engaging structure adopts the engaged position, relative rotation between the brake element and the first device is prevented or reduced. The brake device may be used for both static and dynamic braking of the second device.

A traction wheel may be rotationally supported on the shaft. Since the shaft is part of the first device, the shaft does not rotate relative to the engaging structure. As a consequence, the forcing member cannot be fixed to the shaft like in some prior art solutions. However, by means of the second member having an opening, and the shaft of the first device passing through the opening, the brake device is compact and well suited for being used to brake a traction wheel rotatable about the shaft in a drive unit comprising an electric motor arranged to directly drive the traction wheel.

The brake element and the second device may have a hollow design for accommodating the shaft. For example, in addition to the opening in the second member for receiving the shaft, each of the brake element, the second frictional brake surface and the forcing member may be hollow for receiving the shaft therethrough. In case also the brake element and the forcing member comprise an opening (e.g., if each of the brake element and the forcing member is annular), the shaft may pass through the entire second device. In any case, the second device may be arranged to rotate about the shaft.

Furthermore, since the forcing member is pre-tensioned to force the second frictional brake surface against the first frictional brake surface, and the engaging structure is moved by the actuator to the engaged position where the engaging structure engages the engageable structure to effect braking, a normal force creating the friction force to generate a braking torque is decoupled from the actuator. The brake device therefore provides an effective braking.

The first device may adopt various alternative configurations. In each case, the first device comprises the shaft, and the actuator is connected to the first device such that the engaging structure moves relative to the first device between the disengaged position and the engaged position. In addition to the shaft, the first device may comprise a support for the actuator. The first device may be a stator.

The brake element may be arranged at least partially between the second member and the forcing member. Each of the brake element, the second member and the forcing member may be concentric with the rotation axis. Alternatively, or in addition, each of the brake element, the second member and the forcing member may lie in planes perpendicular to the rotation axis.

The second member may be a rotor. For example, the second member may be an end plate of a traction wheel.

The brake element may be flat, e.g. constituted by a disc. The brake element may be made of metal, such as steel. The brake element may comprise a primary first frictional brake surface facing towards the second member and an opposite secondary first frictional brake surface facing towards the forcing member.

The forcing member may be flat, e.g. constituted by a disc. The forcing member may be made of metal, such as steel.

The pre-tensioning of the forcing member causes a contact interface between the second frictional brake surface and the first frictional brake surface to be clamped. The forcing member thus compresses the brake element such that the second frictional brake surface is forced against the first frictional brake surface. The forcing member may force the brake element in a direction parallel with the rotation axis.

The actuator may be a power off actuator. That is, the actuator may require electric power to move the engaging structure to the disengaged position. When the electric power ceases, the engaging structure automatically returns to the engaged position, e.g. by means of an actuator spring. The actuator may be a solenoid. The brake device may comprise a plurality of actuators, each configured to move an associated engaging structure between a disengaged position and an engaged position.

The engaging structure may move between the disengaged position and the engaged position in a direction parallel with the rotation axis. The engaging structure may be a pin. The pin may be substantially parallel with, or parallel with, the rotation axis.

The brake device may comprise two friction discs. In this case, the brake element may be sandwiched between the two friction discs. A primary friction disc may be fixed to the second member and a secondary friction disc may be fixed to the forcing member. In this case, the primary friction disc may provide a primary second frictional brake surface for frictionally contacting the brake element (e.g., a primary first frictional brake surface thereof), and the secondary friction disc may provide a secondary second frictional brake surface for frictionally contacting the brake element (e.g., a secondary first frictional brake surface thereof). Each friction disc may be annular. Each friction disc may for example be made of rubber. Each friction disc may be concentric with the rotation axis and/or may lie in a respective plane perpendicular to the rotation axis.

The second device may comprise at least one connection device, and the forcing member may be connected to the second member by means of the at least one connection device. The at least one connection device may be elongated. In this case, each connection device may be substantially parallel with, or parallel with, the rotation axis.

The second member may comprise a raised surface and a peripheral surface. Each of the raised surface and the peripheral surface may be concentric with the rotation axis and/or may lie in respective planes perpendicular to the rotation axis. The peripheral surface may surround the raised surface. The raised surface may be raised with respect to the peripheral surface along the rotation axis. The raised surface may be positioned between the peripheral surface and the brake element along the rotation axis. In this case, the at least one connection device may be connected to the peripheral surface. Each of the raised surface and the peripheral surface may be flat.

The forcing member may be pre-tensioned by means of the connection of the one or more connection devices to each of the forcing member and the second member. In addition, the forcing member provides a mounting point for each connection device. This dual functionality of the forcing member contributes to compactness and simplicity of the brake device.

The forcing member may comprise one or more arms. Each arm may provide a mounting point for an associated connection device. The one or more arms may extend radially outwardly with respect to the rotation axis. The forcing member may for example be star-shaped.

The at least one connection device may be arranged radially outside the brake element with respect to the rotation axis. The arrangement of the at least one connection device radially outside the brake element enables a more compact design of the brake device, in particular along the rotation axis. Due to its compact design, the brake device can more easily be integrated into a drive unit comprising a traction wheel.

The brake element and the forcing member may be arranged in a stack. In this case, the brake element may be clamped in the stack. Moreover, the at least one connection device may be arranged radially outside the stack with respect to the rotation axis.

The brake device may comprise a spring deformed by the connection between the forcing member and the second member by means of the at least one connection device. The spring may be constituted by the forcing member. Thus, the forcing member may be flexible. In this way, the need to use a dedicated spring can be avoided. The design of the brake device can thereby be made simpler and more compact.

Alternatively, or in addition, the brake element may comprise a spring, such as a spring washer. Also in this way, the need to use a dedicated spring can be avoided.

The at least one connection device may be configured to adjust the pre-tensioning of the forcing member. For example, the length of each connection device in a direction parallel with the rotation axis may be adjusted to thereby adjust the pre-tensioning of the forcing member.

The at least one connection device may comprise one or more screws. The screws may be arranged such that the pre-tension can be increased by tightening the screws and decreased by loosening the screws. Each screw may engage a thread in the second member, e.g. into the peripheral surface thereof. In this case, the brake element may be arranged between the forcing member and the one or more threads in the second member. Regardless of how high the pre-tension is, the actuator can move the engaging structure to the engaged position to generate a braking torque on the second device.

The at least one connection device may comprise one or more distancing elements arranged to adjust a distance between the forcing member and the second member. For example, when the one or more distancing elements are tightened by means of one or more screws, a defined pre-tension is provided in the brake device. By exchanging the one or more distancing elements with one or more distancing elements of different length(s), a different pre-tension can easily be provided in the brake device. In case the at least one connection device comprises one or more screws, the one or more screws may pass through the distancing elements.

The brake device may further comprise at least one support element arranged to support relative rotation between the brake element and the second device about the rotation axis. By means of the at least one support element, the brake element is kept radially aligned with respect to the rotation axis.

Also, the at least one support element may be arranged radially outside the brake element with respect to the rotation axis. Thus, the stack can be centered with the rotation axis from the outside.

The at least one support element may comprise a rolling-element bearing. Alternatively, or in addition, the at least one support element may comprise a slide bearing. In any case, the brake device may comprise a single support element surrounding the brake element.

The at least one support element may be attached to the at least one connection device. The at least one connection device can thereby perform two functions, namely, to establish the pre-tensioning of the forcing member and to provide a support for the one or more support elements. This greatly contributes to a compact design, and to a simple design due to a reduced number of components. In case the at least one support element is attached to the at least one connection device, the one or more screws may pass through the at least one support element.

The brake element may be arranged entirely between the second member and the forcing member. Thus, the forcing member may be distanced from the second member and not contacting the second member.

The brake element may be annular. In this case, the engageable structure may comprise one or more teeth protruding radially with respect to the rotation axis. When the brake element is annular to comprise an opening, the engaging structure may enter the opening in the engaged position. In case the at least one connection device is arranged radially outside the brake element with respect to the rotation axis, the one or more teeth may protrude radially inwardly with respect to the rotation axis. Conversely, in case the at least one connection device is arranged radially inside the brake element with respect to the rotation axis, the one or more teeth may protrude radially outwardly with respect to the rotation axis.

The forcing member may be annular. In this case, the engaging structure may pass through the forcing member when adopting the engaged position.

According to a further aspect, there is provided a drive unit for an industrial device, the drive unit comprising a brake device according to the present disclosure; a traction wheel rotatable about the rotation axis, the traction wheel comprising the second member; and an electric wheel motor arranged to drive the traction wheel about the rotation axis.

The drive unit may be arranged to drive a mobile robot, such as an automated guided vehicle, AGV. The second member may rotate in common with the traction wheel. For example, the second member may be constituted by an end plate of the traction wheel.

The traction wheel may be rotationally supported on the shaft for rotation about the rotation axis. The shaft may move in common with a base structure (e.g. a platform) of the AGV, e.g. when the AGV moves in a forward direction.

The wheel motor may be arranged to directly drive the traction wheel about the rotation axis. Alternatively, or in addition, the wheel motor may be arranged inside the traction wheel. The brake device can be arranged inside the traction wheel.

According to a further aspect, there is provided an industrial device comprising a brake device according to the present disclosure or a drive unit according to the present disclosure. The industrial device may be an AGV or an industrial robot.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
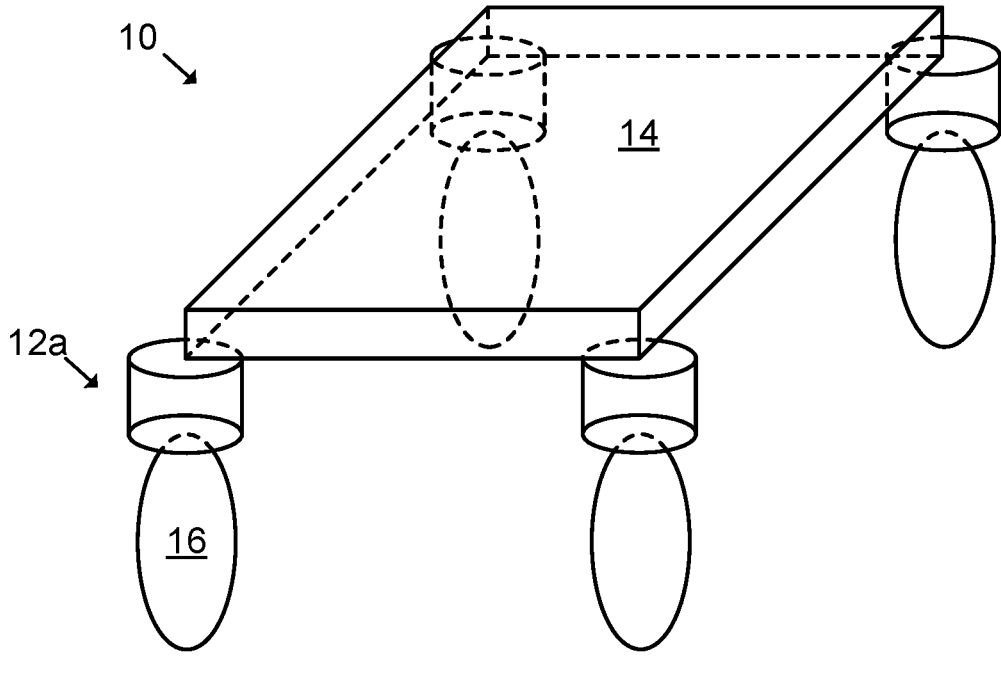
FIG. 1: schematically represents a perspective view of an automated guided vehicle comprising a plurality of drive units.

In the following, a brake device comprising an engaging structure for selectively engaging an engageable structure of a brake element, a drive unit comprising a brake device, and an industrial device comprising a brake device or a drive unit, will be described. The same or similar reference numerals will be used to denote the same or similar structural features.

FIG. 1 schematically represents a perspective view of an automated guided vehicle, AGV, 10. The AGV 10 is one example of an industrial device according to the present disclosure. The AGV 10 comprises a plurality of drive units 12*a*. The AGV 10 further comprises a platform 14. In FIG. 1, the AGV 10 comprises four drive units 12*a*. The AGV 10 may however comprise fewer than four drive units 12*a* or more than four drive units 12*a*. Each drive unit 12*a* comprises a traction wheel 16. By means of the traction wheels 16, the AGV 10 can be driven on a surface, such as a floor.

Figure 2:
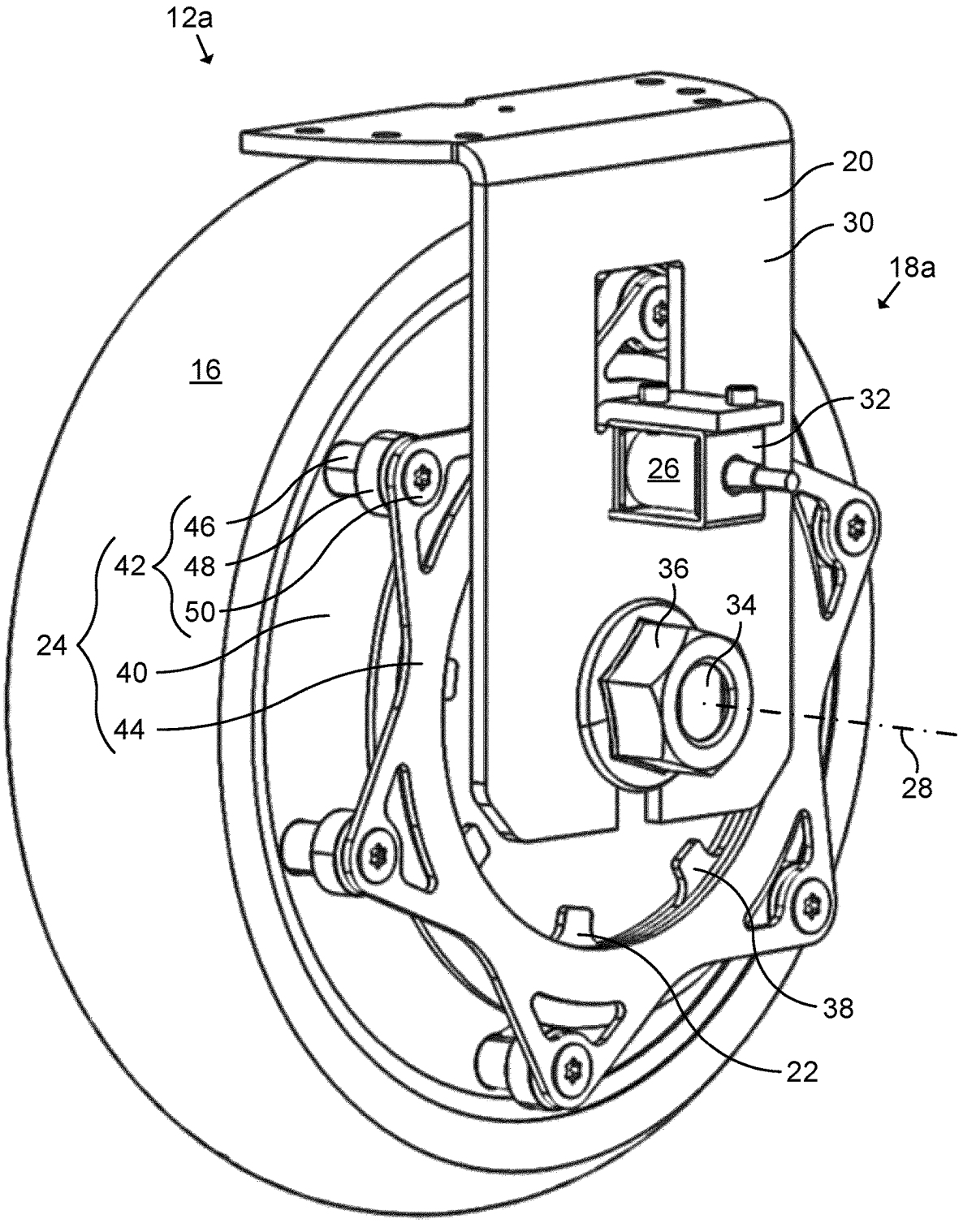
FIG. 2: schematically represents a perspective view of one of the drive units comprising a brake device.

FIG. 2 schematically represents a perspective view of one of the drive units 12*a* in FIG. 1. The drive unit 12*a* comprises a brake device 18*a*. The brake device 18*a* comprises a first device 20, a brake element 22, a second device 24 and an actuator 26. The traction wheel 16 is rotatable about a rotation axis 28. The traction wheel 16 in FIG. 2 is an outrunner and does not comprise any exposed rotating shaft.

The first device 20 of this specific example comprises a wheel support 30 and an actuator support 32 fixed to the wheel support 30. The wheel support 30 of this specific example is formed from a single metal sheet. The wheel support 30 may be rotatable relative to the platform 14 about a steering axis (not illustrated) perpendicular to the rotation axis 28. Alternatively, the wheel support 30 may be fixed to the platform 14. An additional wheel support may optionally be provided on an opposite side of the traction wheel 16.

The first device 20 further comprises a shaft 34. The shaft 34 is fixed to the wheel support 30, here by means of a nut 36. The traction wheel 16 is rotatable around the shaft 34.

The brake element 22 comprises a plurality of teeth 38. The teeth 38 constitute an example of an engageable structure according to the present disclosure. The teeth 38 protrude radially inwardly with respect to the rotation axis 28.

The second device 24 comprises a second member 40, a plurality of connection devices 42 (six in this example) and a forcing member 44. The second device 24 is rotatable relative to the first device 20 about the rotation axis 28. The forcing member 44 is connected to the second member 40 by means of the connection devices 42. The second member 40 forms a rotor that rotates together with the traction wheel 16.

The actuator 26 is connected to the first device 20, here to the actuator support 32. The brake device 18*a* can provide a very high braking torque to the AGV 10 with a very small actuator 26.

As shown in FIG. 2, the connection devices 42 are arranged radially outside the brake element 22 with respect to the rotation axis 28. This contributes to a compact design of the brake device 18*a* and a simple integration to the drive unit 12*a*.

The brake element 22 and the forcing member 44 are arranged in a stack. In this example, the connection devices 42 are also arranged radially outside the entire stack with respect to the rotation axis 28.

Each connection device 42 of this example comprises a distancing element 46, a rolling-element bearing 48 and a screw 50. The rolling-element bearings 48 are examples of support elements according to the present disclosure. The screws 50 threadingly engage the second member 40. The forcing member 44 is thereby deformed to compress the brake element 22 between the forcing member 44 and the second member 40. Each screw 50 passes through the forcing member 44, an associated rolling-element bearing 48 and an associated distancing element 46. The rolling-element bearings 48 and the distancing element 46 are thus supported by the screws 50.

The connection between the forcing member 44 and the second member 40 by means of the connection devices 42 causes deformation of the forcing member 44 and a pre-tension to be generated in the stack. The brake element 22 is thereby clamped in the stack. The deformation of the forcing member 44, and consequentially the pre-tension, can be adjusted by means of the screws 50.

In this example, each connection device 42 has an elongated shape and is oriented parallel with the rotation axis 28. The rolling-element bearings 48 rotationally support relative rotation between the brake element 22 and the second device 24 about the rotation axis 28, and radially aligns the brake element 22 with respect to the rotation axis 28.

By means of the distancing elements 46, a distance between the forcing member 44 and the second member 40 can be adjusted. Thus, by selecting a length of the distancing elements 46 and tightening the screws 50, a defined pre-tension is created in the forcing member 44.

Figure 3:
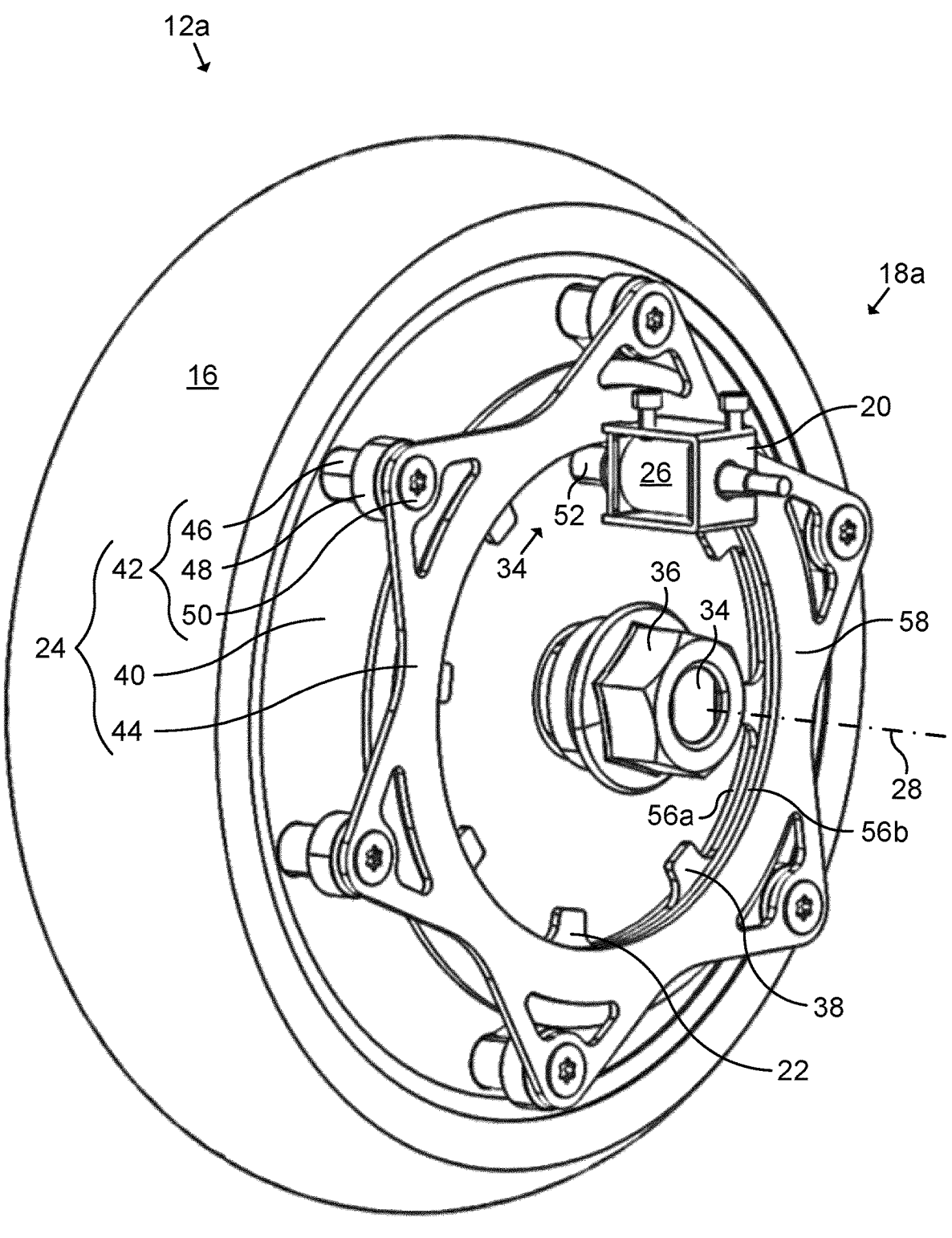
FIG. 3: schematically represents a partial perspective view of the drive unit.

FIG. 3 schematically represents a partial perspective view of the drive unit 12*a*. In FIG. 3, the wheel support 30 is removed to improve visibility. As shown in FIG. 3, the actuator 26 comprises an actuator pin 52. The actuator pin 52 is one example of an engaging structure according to the present disclosure. In FIG. 3, the actuator pin 52 is in an engaged position 54. In the engaged position 54, the actuator pin 52 engages one of the teeth 38. By means of this engagement, relative rotation between the first device 20 and the second device 24 about the rotation axis 28 can be frictionally braked.

As shown in FIG. 3, the second device 24 further comprises a primary friction disc 56*a* and a secondary friction disc 56*b*. The primary friction disc 56*a* is arranged between the second member 40 and the brake element 22. The secondary friction disc 56*b* is arranged between the brake element 22 and the forcing member 44. The primary friction disc 56*a*, the brake element 22, the secondary friction disc 56*b* and the forcing member 44 are arranged in the stack. In this example, the primary friction disc 56*a* is fixed to the second member 40 and the secondary friction disc 56*b* is fixed to the forcing member 44.

FIG. 3 further shows that the brake device 18*a* comprises a spring 58. In this example, the spring 58 is constituted by the forcing member 44, which is flexible. The forcing member 44 is deformed by the connection between the forcing member 44 and the second member 40 by means of the connection devices 42.

Figure 4:
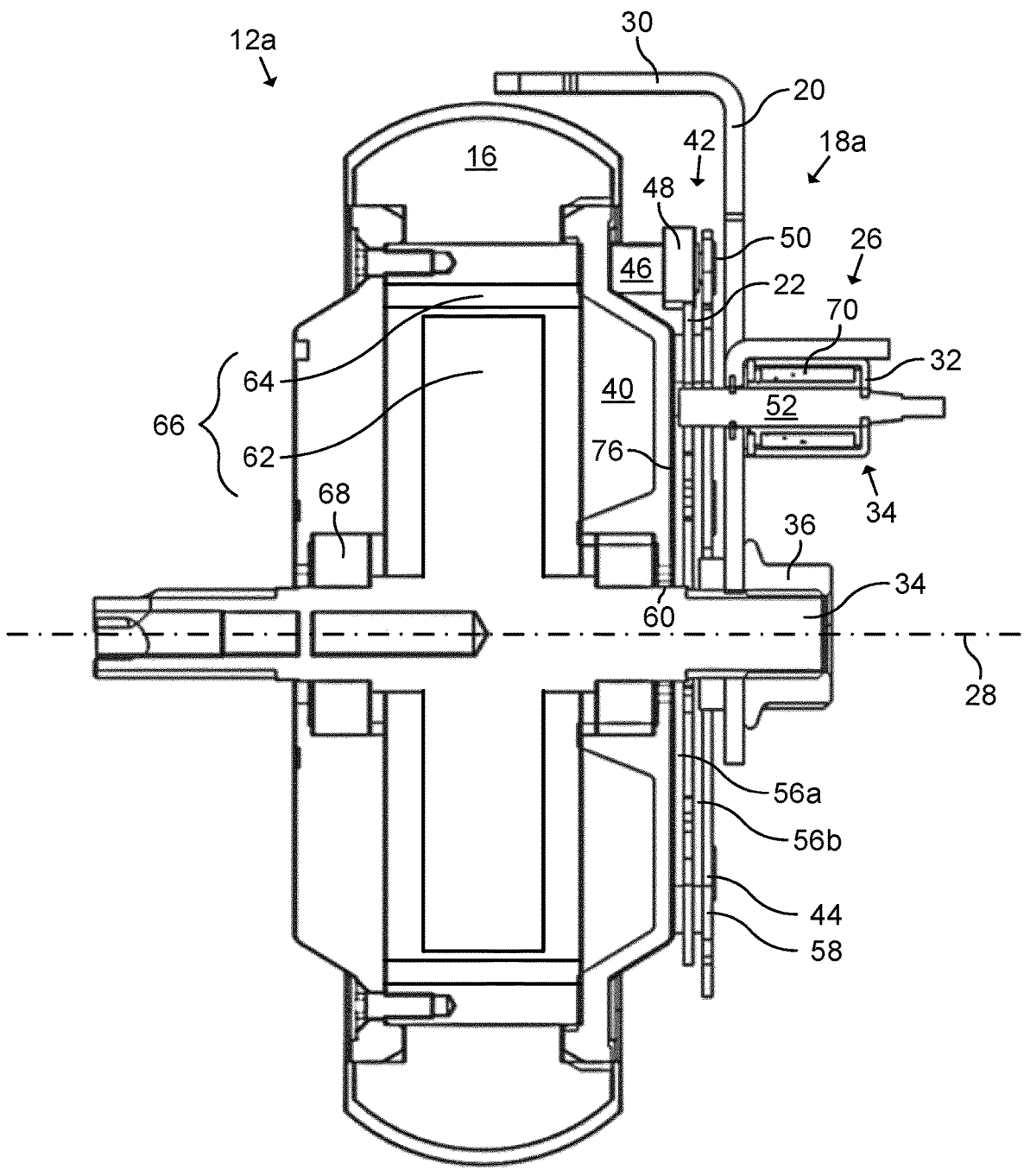
FIG. 4: schematically represents a cross-sectional side view of the drive unit.

FIG. 4 schematically represents a cross-sectional side view of the drive unit 12*a*. As shown in FIG. 4, the brake element 22 is positioned entirely between the second member 40 and the forcing member 44.

The second member 40 of this example constitutes an end plate of the traction wheel 16. The second member 40 comprises an opening 60. The shaft 34 passes through the opening 60.

The traction wheel 16 further comprises a stator 62 fixed to the shaft 34, and rotor magnets 64 fixed to the second member 40. The stator 62 and the rotor magnets 64 form one example of an electric wheel motor 66 arranged to directly drive the traction wheel 16 to rotate about the rotation axis 28. As shown in FIG. 4, the stator 62 and the rotor magnets 64 are arranged inside the traction wheel 16.

The traction wheel 16 further comprises wheel bearings 68. The traction wheel 16 is rotationally supported on the shaft 34 by means of the wheel bearings 68 for rotation about the rotation axis 28.

FIG. 4 further shows that the actuator 26 of this example comprises an actuator spring 70. The actuator spring 70 is deformed to force the actuator pin 52 towards the engaged position 54.

Figure 5:
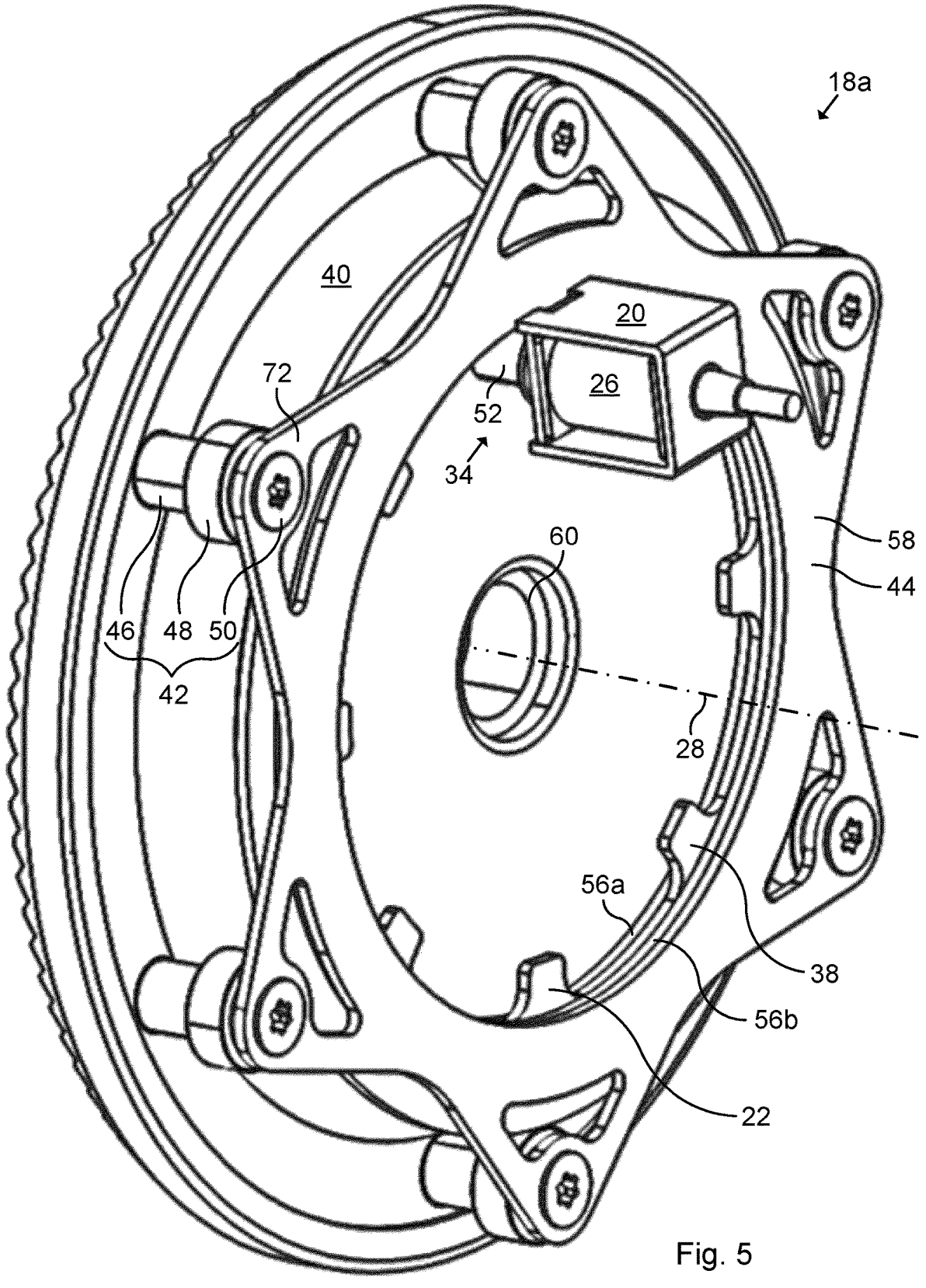
FIG. 5: schematically represents a partial perspective view of the brake device.

FIG. 5 schematically represents a partial perspective view of the brake device 18*a*. The specific topology of the stack may be varied. For example, the primary friction disc 56*a* does not have to be fixed to the second member 40 and the secondary friction disc 56*b* does not have to be fixed to the forcing member 44. Moreover, an additional brake element may be provided in the stack.

The forcing member 44 comprises a plurality of arms 72 (six in this example).

Each arm 72 extends radially outwardly with respect to the rotation axis 28. As shown in FIG. 5, the forcing member 44 is star-shaped. Each arm 72 provides a mounting point for an associated screw 50. The arms 72 are bent towards the second member 40 when tightening the screws 50. This causes elastic deformation of the forcing member 44 and generates a pre-tension in the stack.

Figure 6:
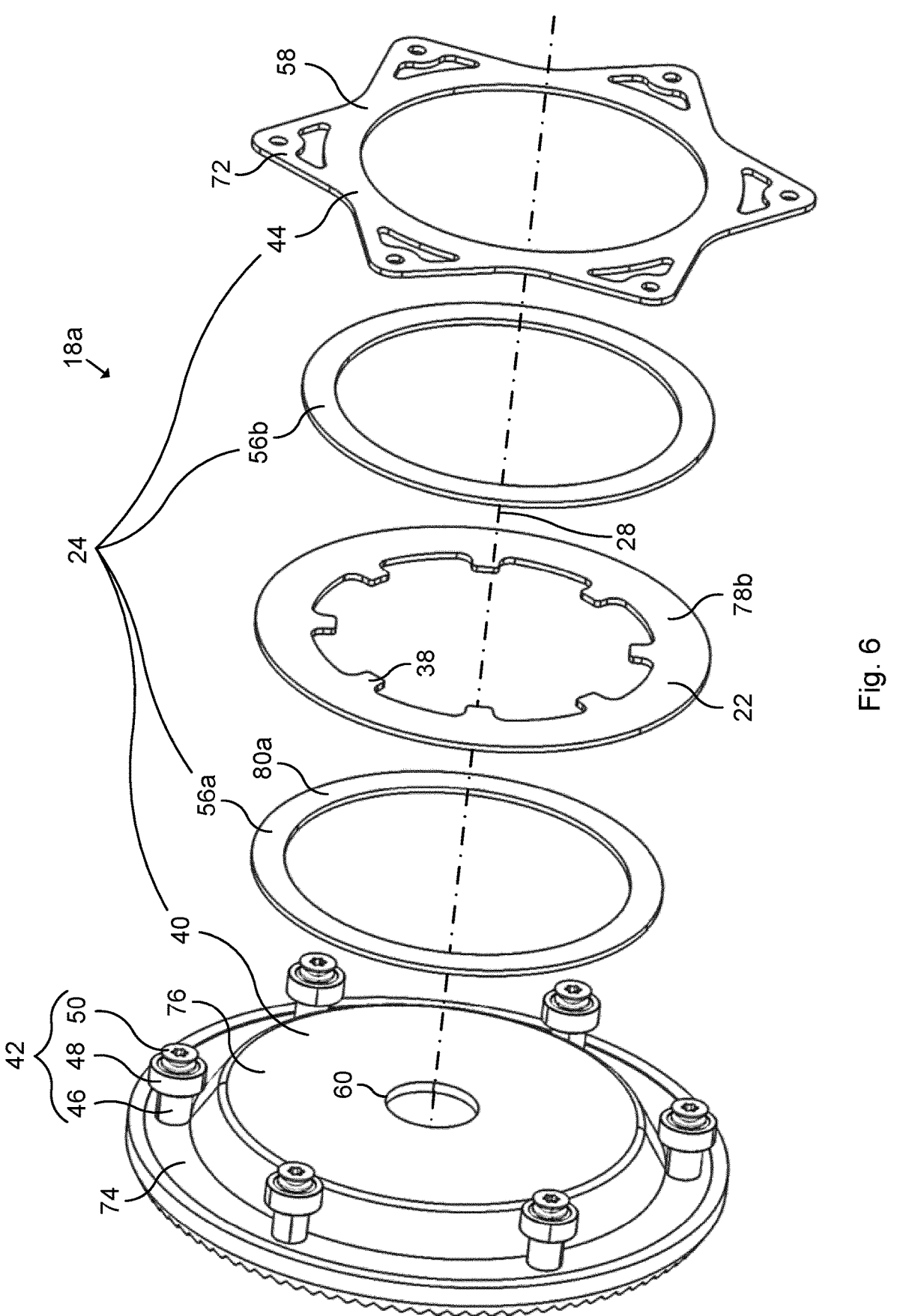
FIG. 6: schematically represents a perspective exploded partial view of the brake device.
Figure 7:
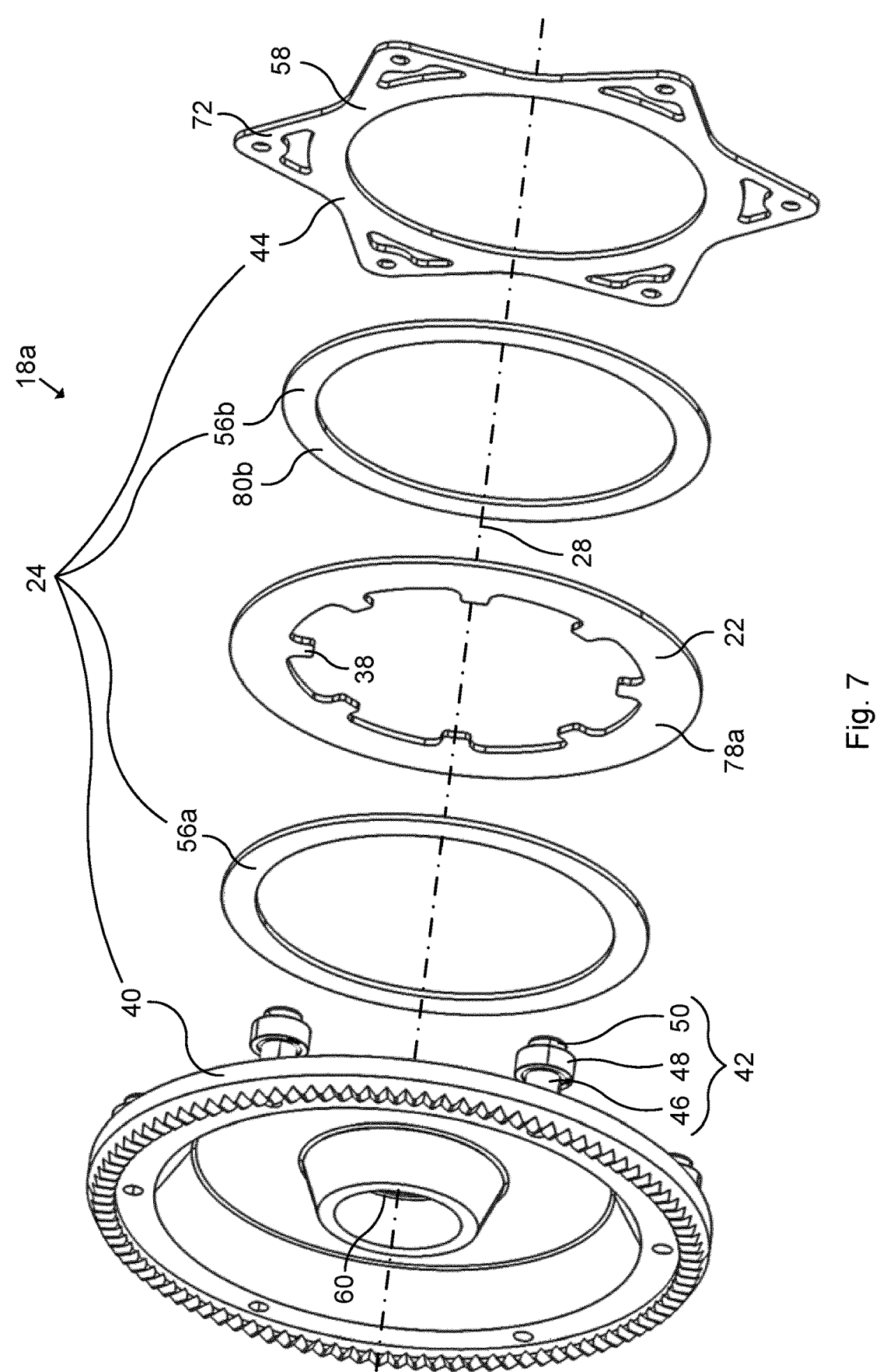
FIG. 7: schematically represents a further perspective exploded partial view of the brake device.

FIG. 6 schematically represents a perspective exploded partial view of the brake device 18*a*, and FIG. 7 schematically represents a further perspective exploded partial view of the brake device 18*a*. With collective reference to FIGS. 6 and 7, it can be seen that each of the second member 40, the primary friction disc 56*a*, the brake element 22, the secondary friction disc 56*b* and the forcing member 44 of this example is annular, flat and concentric with the rotation axis 28. The second member 40, the primary friction disc 56*a*, the brake element 22, the secondary friction disc 56*b* and the forcing member 44 can thereby be produced at a low cost, e.g. by means of water cutting. Moreover, the hollow design of the primary friction disc 56*a*, the brake element 22, the secondary friction disc 56*b* and the forcing member 44, in combination with the opening 60 in the second member 40, enable the shaft 34 to pass through the second device 24.

The brake element 22 and the forcing member 44 may be made of steel. The primary friction disc 56*a* and the secondary friction disc 56*b* may be made of rubber. The teeth 38 of the brake element 22 can be seen more clearly in FIGS. 6 and 7.

The second member 40 comprises a peripheral surface 74 and a raised surface 76. Each of the peripheral surface 74 and the raised surface 76 is annular, flat, and concentric with the rotation axis 28. The peripheral surface 74 surrounds the raised surface 76. The raised surface 76 lies between the peripheral surface 74 and the brake element 22 along the rotation axis 28. The screws 50 threadingly engage female threads in the peripheral surface 74. Outer diameters of the raised surface 76, the primary friction disc 56*a*, the brake element 22 and the secondary friction disc 56*b* are substantially equal. An outer diameter of the forcing member 44 (neglecting the arms 72) is also substantially equal to these outer diameters.

In this example, the primary friction disc 56*a* is a brake pad material fixed to the raised surface 76 and the secondary friction disc 56*b* is a brake pad material fixed to the forcing member 44. The brake element 22 comprises a primary first frictional brake surface 78*a* and a secondary first frictional brake surface 78*b*. The primary first frictional brake surface 78*a* faces towards the second member 40. The secondary first frictional brake surface 78*b* faces towards the forcing member 44. The primary friction disc 56*a* comprises a primary second frictional brake surface 80*a* facing towards the brake element 22. The secondary friction disc 56*b* comprises a secondary second frictional brake surface 80*b* facing towards the brake element 22.

In operation of the brake device 18*a*, the primary second frictional brake surface 80*a* is in frictional contact with the primary first frictional brake surface 78*a* and the secondary second frictional brake surface 80*b* is in frictional contact with the secondary first frictional brake surface 78*b*. Since the forcing member 44 is pre-tensioned by the connection devices 42, the secondary second frictional brake surface 80*b* is forced against the secondary first frictional brake surface 78*b* and the primary first frictional brake surface 78*a* is forced against the primary second frictional brake surface 80*a*.

Figure 8:
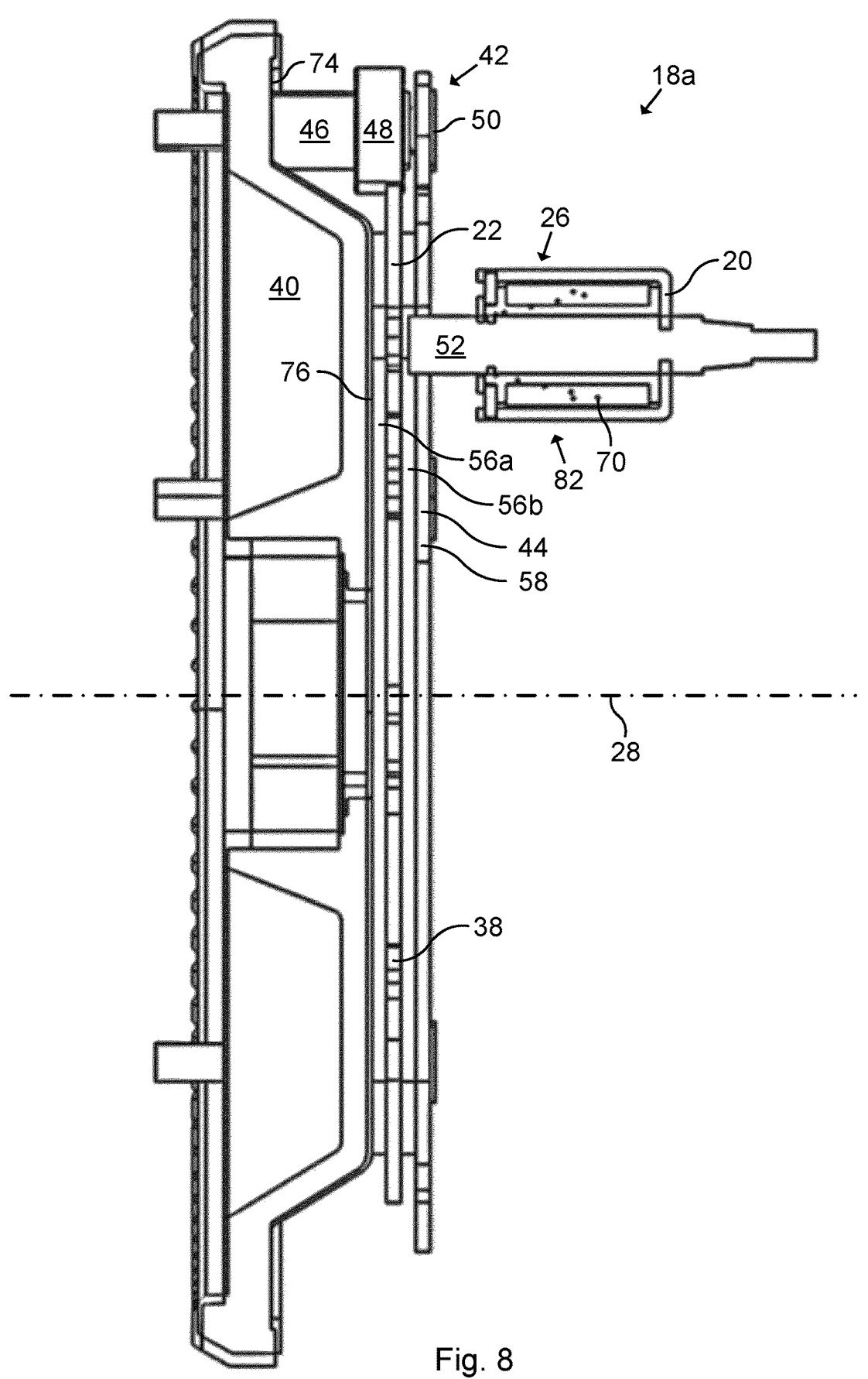
FIG. 8: schematically represents a partial cross-sectional side view of the brake device when an engaging structure adopts a disengaged position.

FIG. 8 schematically represents a partial cross-sectional side view of the brake device 18*a*. In FIG. 8, the actuator pin 52 adopts a disengaged position 82. In the disengaged position 82, the actuator pin 52 is retracted away from the brake element 22 and does therefore not engage the teeth 38. When electric power is supplied to the actuator 26, the actuator pin 52 moves from the engaged position 54 to the disengaged position 82 against the deformation force of the actuator spring 70. The second device 24 is thereby free to rotate about the rotation axis 28. The brake element 22 then rotates together with the second device 24.

Figure 9:
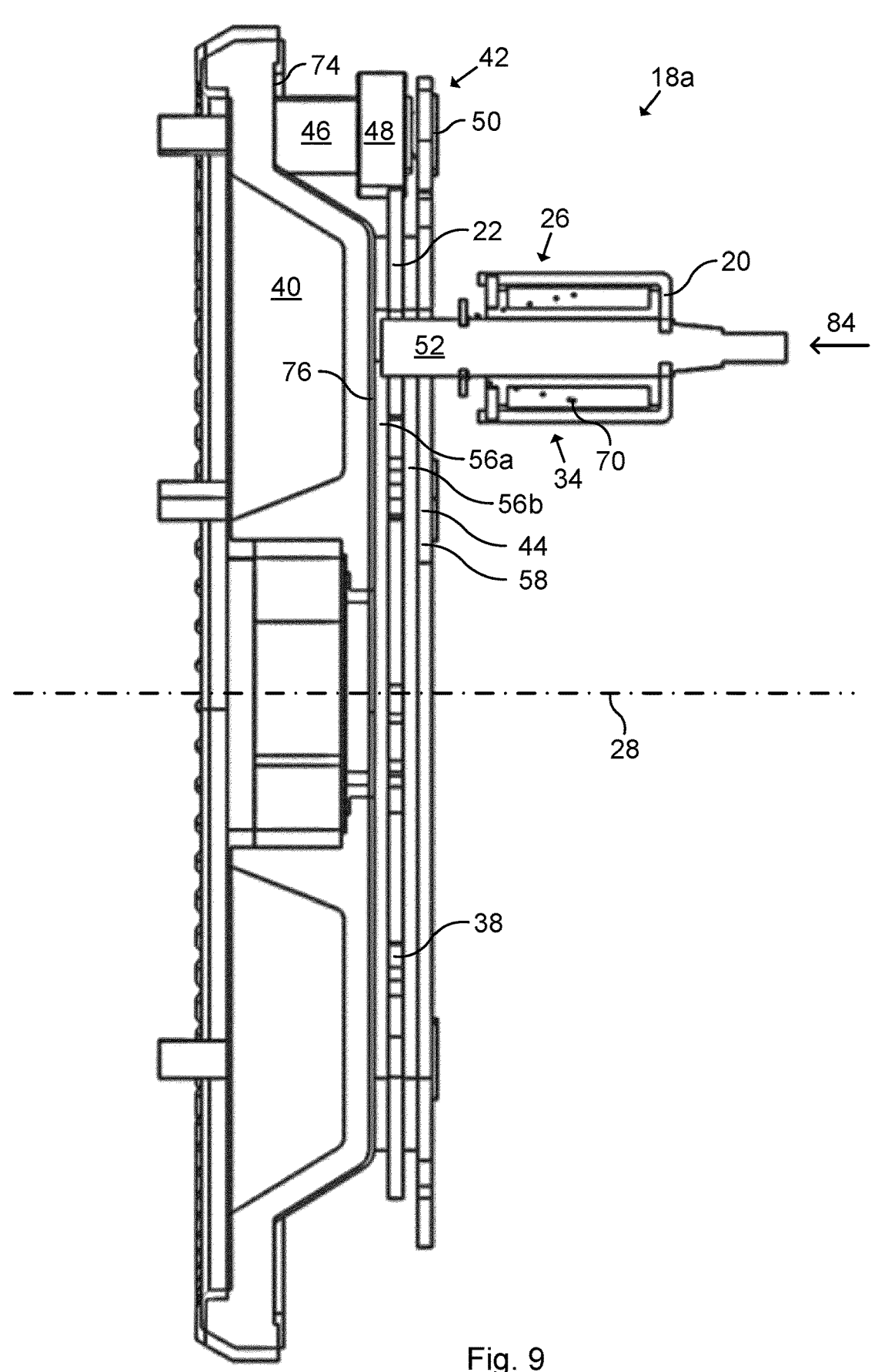
FIG. 9: schematically represents a partial cross-sectional side view of the brake device when the engaging structure adopts an engaged position.

FIG. 9 schematically represents a partial cross-sectional side view of the brake device 18*a*. In FIG. 9, the actuator pin 52 adopts the engaged position 54. When electric power ceases to be supplied to the actuator 26, the actuator spring 70 forces the actuator pin 52 to move from the disengaged position 82 to the engaged position 54 in a direction 84 parallel with the rotation axis 28. The actuator 26 is thus a power off actuator.

In the engaged position 54, the actuator pin 52 locks the brake element 22 by engagement with one of the teeth 38 such that frictional sliding occurs between the primary second frictional brake surface 80*a* and the primary first frictional brake surface 78*a*, and between the secondary first frictional brake surface 78*b* and the secondary second frictional brake surface 80*b*. The rotational speed of the second device 24 is thereby frictionally braked. The actuator pin 52 passes through the forcing member 44 and through the secondary friction disc 56*b* in the engaged position 54.

Figure 10:
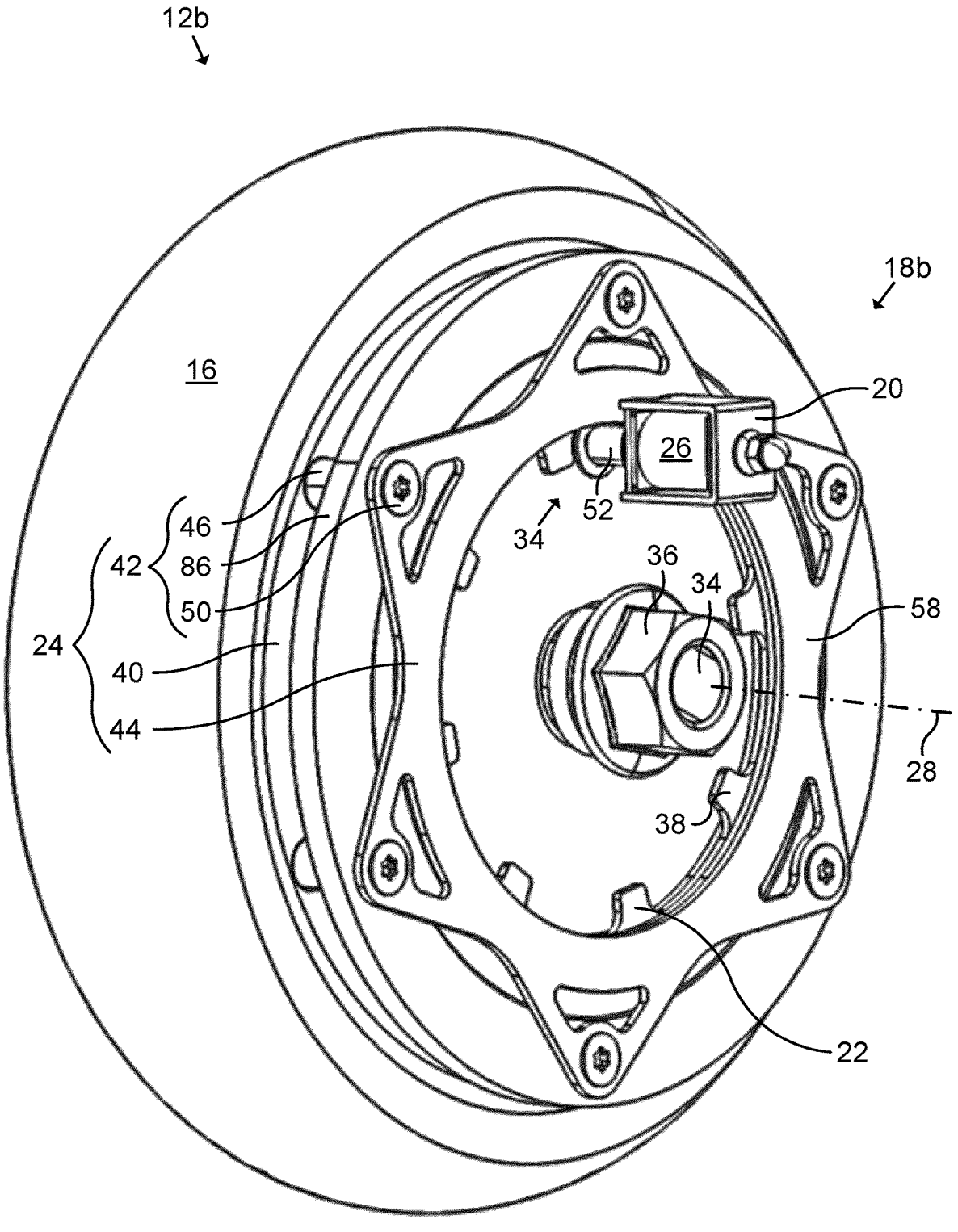
FIG. 10: schematically represents a partial perspective view of an alternative drive unit.

FIG. 10 schematically represents a partial perspective view of an alternative drive unit 12*b*. The drive unit 12*b* comprises an alternative brake device 18*b*. The brake device 18*b* differs from the brake device 18*a* in that instead of the plurality of rolling-element bearings 48, the brake device 18*b* comprises a single annular slide bearing 86. The slide bearing 86 lies in the same plane as the brake element 22 and surrounds the brake element 22. The slide bearing 86 rotationally supports relative rotation between the brake element 22 and the second device 24 about the rotation axis 28 by means of frictional contact between the brake element 22 and the slide bearing 86. The slide bearing 86 thus constitutes a further example of a support element according to the present disclosure. The slide bearing 86 may be made of a low friction material, such as Teflon®.

The screws 50 pass through the slide bearing 86. The slide bearing 86 is thereby supported by the screws 50.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A brake device comprising:
a first device having a shaft;
a brake element having a first frictional brake surface and an engageable structure;
a second device rotatable relative to the first device about a rotation axis, the second device comprising:
a member having an opening,
a second frictional brake surface, and
a forcing member pre-tensioned to force the second frictional brake surface against the first frictional brake surface; and
an actuator connected to the first device, the actuator including an engaging structure movable between a disengaged position, where the engaging structure does not engage the engageable structure, and an engaged position, where the engaging structure engages the engageable structure to brake relative rotation between the first device and the second device about the rotation axis;
wherein the shaft is concentric with the rotation axis and passes through the opening.

2. The brake device according to claim 1, wherein the second device comprises at least one connection device, and wherein the forcing member is connected to the member by means of the at least one connection device.

3. The brake device according to claim 2, wherein the at least one connection device is arranged radially outside the brake element with respect to the rotation axis.

4. The brake device according to claim 3, wherein the forcing member comprises a spring and wherein the forcing member is deformed by the connection between the forcing member and the member by means of the at least one connection device.

5. The brake device according to claim 3, wherein the at least one connection device is configured to adjust the pre-tensioning of the forcing member.

6. The brake device according to claim 3, wherein the at least one connection device comprises one or more screws.

7. The brake device according to claim 3, wherein the at least one connection device comprises one or more distancing elements arranged to adjust a distance between the forcing member and the member.

8. The brake device according to claim 2, wherein the forcing member comprises a spring and wherein the forcing member is deformed by the connection between the forcing member and the member by means of the at least one connection device.

9. The brake device according to claim 2, wherein the brake element comprises a spring, and wherein the spring is deformed by the connection between the forcing member and the member by means of the at least one connection device.

10. The brake device according to claim 2, wherein the at least one connection device is configured to adjust the pre-tensioning of the forcing member.

11. The brake device according to claim 2, wherein the at least one connection device comprises one or more screws.

12. The brake device according to claim 2, wherein the at least one connection device comprises one or more distancing elements arranged to adjust a distance between the forcing member and the member.

13. The brake device according to claim 1, further comprising at least one support element arranged to support relative rotation between the brake element and the second device about the rotation axis.

14. The brake device according to claim 13, wherein the second device comprises at least one connection device, and wherein the forcing member is connected to the member by means of the at least one connection device, and wherein the at least one support element is attached to the at least one connection device.

15. The brake device according claim 1, wherein the brake element is arranged entirely between the member and the forcing member.

16. The brake device according to claim 1, wherein the brake element is annular, and wherein the engageable structure includes one or more teeth protruding radially with respect to the rotation axis.

17. The brake device according to claim 1, wherein the forcing member is annular, and wherein the engaging structure passes through the forcing member when adopting the engaged position.

18. A drive unit for an industrial device, the drive unit comprising:
a brake device having
a first device having a shaft;
a brake element having a first frictional brake surface and an engageable structure;
a second device rotatable relative to the first device about a rotation axis, the second device comprising:
a member having an opening,
a second frictional brake surface, and
a forcing member pre-tensioned to force the second frictional brake surface against the first frictional brake surface; and
an actuator connected to the first device, the actuator including an engaging structure movable between a disengaged position, where the engaging structure does not engage the engageable structure, and an engaged position, where the engaging structure engages the engageable structure to brake relative rotation between the first device and the second device about the rotation axis;
wherein the shaft is concentric with the rotation axis and passes through the opening;
a traction wheel rotatable about the rotation axis, the traction wheel including the second member; and
an electric wheel motor arranged to drive the traction wheel about the rotation axis.

19. An industrial device comprising a brake device having:
a first device having a shaft;
a brake element having a first frictional brake surface and an engageable structure;
a second device rotatable relative to the first device about a rotation axis, the second device comprising:
a member having an opening,
a second frictional brake surface, and
a forcing member pre-tensioned to force the second frictional brake surface against the first frictional brake surface; and
an actuator connected to the first device, the actuator including an engaging structure movable between a disengaged position, where the engaging structure does not engage the engageable structure, and an engaged position, where the engaging structure engages the engageable structure to brake relative rotation between the first device and the second device about the rotation axis;

13

14 wherein the shaft is concentric with the rotation axis and passes through the opening or a drive unit.

* * * * *